United States Patent
He et al.

(10) Patent No.: US 9,424,493 B2
(45) Date of Patent: Aug. 23, 2016

(54) GENERIC OBJECT DETECTION IN IMAGES

(71) Applicant: Microsoft Technology Licensing, LLC, Redmond, WA (US)

(72) Inventors: Kaiming He, Beijing (CN); Jian Sun, Beijing (CN); Xiangyu Zhang, Anhui (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 60 days.

(21) Appl. No.: 14/617,909

(22) Filed: Feb. 9, 2015

(65) Prior Publication Data
US 2016/0104058 A1    Apr. 14, 2016

(30) Foreign Application Priority Data
Oct. 9, 2014    (WO) ................ PCT/CN2014/088165

(51) Int. Cl.
*G06K 9/62*    (2006.01)
*G06K 9/66*    (2006.01)
*G06F 17/30*    (2006.01)

(52) U.S. Cl.
CPC ........... *G06K 9/66* (2013.01); *G06F 17/30247* (2013.01); *G06F 17/30271* (2013.01); *G06K 9/6255* (2013.01)

(58) Field of Classification Search
USPC .............. 382/156, 157, 158, 170, 224, 260; 706/15, 16, 20, 25
See application file for complete search history.

(56) References Cited

U.S. PATENT DOCUMENTS

| | | | |
|---|---|---|---|
| 6,272,261 B1 * | 8/2001 | Matsuoka | G06T 3/4007 382/190 |
| 6,819,790 B2 * | 11/2004 | Suzuki | G06T 7/0012 382/130 |
| 7,580,587 B2 * | 8/2009 | Matsugu | G06K 9/00228 382/190 |
| 7,643,702 B1 * | 1/2010 | Brandt | G06K 9/00986 382/190 |
| 7,756,305 B2 * | 7/2010 | Price | G01N 21/6458 128/922 |
| 8,027,532 B2 * | 9/2011 | Marcon | G06K 9/00281 382/118 |
| 8,233,711 B2 | 7/2012 | Wang et al. | |
| 8,345,984 B2 * | 1/2013 | Ji | G06K 9/00335 382/103 |
| 8,374,442 B2 | 2/2013 | Yu et al. | |
| 8,442,321 B1 | 5/2013 | Chang et al. | |
| 8,447,119 B2 | 5/2013 | Yu | |
| 8,594,385 B2 | 11/2013 | Marchesotti et al. | |
| 8,761,510 B2 | 6/2014 | Russakovsky et al. | |
| 2008/0260239 A1 | 10/2008 | Han et al. | |
| 2013/0129143 A1 | 5/2013 | Chen et al. | |

OTHER PUBLICATIONS

Chang, et al., "Libsvm: A Library for Support Vector Machines", In ACM Transactions on Intelligent Systems and Technology, May 2011, 39 pages.

(Continued)

*Primary Examiner* — Yosef Kassa
(74) *Attorney, Agent, or Firm* — Sandy Swain; Jim Ross; Micky Minhas

(57) ABSTRACT

Neural networks for object detection in images are used with a spatial pyramid pooling (SPP) layer. Using the SPP network structure, a fixed-length representation is generated regardless of image size and scale. The feature maps are computed from the entire image once, and the features are pooled in arbitrary regions (sub-images) to generate fixed-length representations for training the detectors. Thus, repeated computation of the convolutional features is avoided while accuracy is enhanced.

20 Claims, 5 Drawing Sheets

(56) References Cited

OTHER PUBLICATIONS

Chatfield, et al., "The Devil is in the Details: An Evaluation of Recent Feature Encoding Methods", In British Machine Vision Conference, Aug. 29, 2011, 12 pages.
Cheng, et al., "BING: Binarized normed gradients for objectness estimation at 300fps", In IEEE Computer Society Conference on Computer Vision and Pattern Recognition, Jun. 24, 2014, 8 pages.
Coates, et al., "The Importance of Encoding Versus Training With Sparse Coding and Vector Quantization", In Proceedings of the 28th International Conference on Machine Learning, Jun. 28, 2011, 8 pages.
Dalal, et al., "Histograms of oriented gradients for human detection", In Proceedings of the IEEE Computer Society Conference on Computer Vision and Pattern Recognition, Jun. 25, 2005, 8 pages.
Deng, et al., "Imagenet: A Large-Scale Hierarchical Image Database", In IEEE Conference on Computer Vision and Pattern Recognition, Jun. 25, 2009, 8 pages.
Denton, et al., "Exploiting Linear Structure within Convolutional Networks for Efficient Evaluation", In Proceeding of the Computing Research Repository, Apr. 2014, 11 pages.
Donahue, et al., "Decaf: A deep convolutional activation feature for generic visual recognition", In arXiv preprint arXiv:1310.1531, Oct. 2013, 10 pages.
Everingham, et al., "The Pascal Visual Object Classes (VOC) Challenge", In Journal International Journal of Computer Vision, vol. 88, Issue 2, Jun. 2010, 34 pages.
Fei, et al., "Learning generative visual models from few training examples: An Incremental Bayesian Approach Tested on 101 Object Categories", In Journal Computer Vision and Image Understanding, vol. 106, Issue 1, Apr. 2007, 9 pages.
Felzenszwalb, et al., "Object Detection with Discriminatively Trained Partbased Models", In IEEE Transactions on Pattern Analysis and Machine Intelligence, vol. 32, Issue 9, Sep. 2010, 20 pages.
Girshick, et al., "Rich Feature Hierarchies for Accurate Object Detection and Semantic Segmentation", In Conference on Computer Vision and Pattern Recognition, Jun. 14, 2014, 8 pages.
Gong, et al., "Multi-scale orderless pooling of deep convolutional activation features", In Proceedings of arXiv:1403.1840, Mar. 2014, 16 pages.
Grauman, et al., "The Pyramid Match Kernel: Discriminative Classification with Sets of Image Features", In Tenth IEEE International Conference on Computer Vision, Oct. 17, 2005, 8 pages.
Howard, Andrew G., "Some Improvements on Deep Convolutional Neural Network Based Image Classification", In Proceeding of the Computing Research Repository, Dec. 2013, 6 pages.
Krizhevsky, et al., "Imagenet classification with deep convolutional neural networks", In Advances in Neural Information Processing Systems, Dec. 3, 2012, 9 pages.
Lazebnik, et al., "Beyond Bags of Features: Spatial Pyramid Matching for Recognizing Natural Scene Categories", In Proceedings of the IEEE Computer Society Conference on Computer Vision and Pattern Recognition—vol. 2, Jun. 17, 2006, 8 pages.
Lecun, et al., "Backpropagation applied to handwritten zip code recognition", In Journal Neural Computation, vol. 1, Issue 4, Dec. 1, 1989, 11 pages.
Lowe, David G., "Distinctive Image Features from Scale-Invariant Keypoints", In Journal International Journal of Computer Vision, vol. 60, Issue 2, Jan. 5, 2004, 28 pages.
Mathieu, et al., "Fast training of convolutional networks through ffts", In Proceeding of arXiv:1312.5851, Dec. 2013, 9 pages.
Oquab, et al., "Learning and Transferring Mid-Level Image Representations using Convolutional Neural Networks", In Proceedings of the Computer Society Conference on Computer Vision and Pattern Recognition, Jun. 24, 2014, 8 pages.

Perronnin, et al., "Improving the Fisher Kernel for Large-Scale Image Classification", In Proceedings of the 11th European conference on Computer vision: Part IV, Sep. 5, 2010, 14 pages.
Razavian, et al., "Cnn features off-the-shelf: An astounding baseline for recogniton", In Proceedings of the Computer Society Conference on Computer Vision and Pattern Recognition, Mar. 2014, 8 pages.
Sermanet, et al., "Overfeat: Integrated Recognition, Localization and Detection Using Convolutional Networks", In Proceeding of arXiv preprint arXiv:1312.6229, Dec. 21, 2013, 16 pages.
Sivic, et al., "Video google: a text retrieval approach to object matching in videos", In Proceedings of the Ninth IEEE International Conference on Computer Vision, Oct. 13, 2003, 8 pages.
Szegedy, et al., "Deep Neural Networks for Object Detection", In Proceeding of Neural Information Processing Systems Foundation, Dec. 2013, 9 pages.
Taigman, et al., "Deepface:Closing the gap to human-level performance in face verification", In Proceedings of the IEEE Conference on Computer Vision and Pattern Recognition, Mar. 11, 2014, 8 pages.
Sande, et al., "Segmentation as Selective Search for Object Recognition", In IEEE International Conference on Computer Vision, Nov. 6, 2011, 8 pages.
Gemert, et al., "Kernel Codebooks for Scene Categorization", In Proceeding of 10th European Conference on Computer Vision, Oct. 12, 2008, 15 pages.
Wang, et al., "Locality-Constrained Linear Coding for Image Classification", In IEEE Conference on Computer Vision and Pattern Recognition, Jun. 13, 2010, 8 pages.
Wang, et al., "Regionlets for generic object detection", In IEEE International Conference on Computer Vision, Dec. 2013, 8 pages.
Yang, et al., "Linear Spatial Pyramid Matching using Sparse Coding for Image Classification", In IEEE Computer Society Conference on Computer Vision and Pattern Recognition.
Zeiler, et al., "Visualizing and Understanding Convolutional Neural Networks", In Proceeding of the Computing Research Repository, Nov. 2013, 11 pages.
Zhang, et al., "Panda: Pose aligned networks for deep attribute modeling", In Conference on Computer Vision and Pattern Recognition, Jun. 24, 2014, 8 pages.
Zou, et al., "Generic object detection with dense neural patterns and regionlets", In Proceeding of the Computing Research Repository, Apr. 2014, 9 pages.
He, et al., "Spatial Pyramid Pooling in Deep Convolutional Networks for Visual Recognition", In Proceeding of arXiv preprint arXiv:1406.4729, Jun. 2014, 11 pages.
Sande, et al., "Fisher and VLAD with FLAIR", In IEEE Conference on Computer Vision and Pattern Recognition, Jun. 23, 2013, 8 pages.
Vijayanarasimhan, et al., "Large-Scale Live Active Learning Training Object Detectors with Crawled Data and Crowds", In Proceedings of the IEEE Conference on Computer Vision and Pattern Recognition, Jun. 20, 2011, 8 pages.
Han, et al., "Hierarchical spatial pyramid max pooling based on SIFT features and sparse coding for image classification", In Proceeding of Computer Vision, vol. 7, Issue 2, Apr. 2013, 7 pages.
Yang, et al., "Supervised translation-invariant sparse coding", In IEEE Conference on Computer Vision and Pattern Recognition (CVPR), Jun. 13, 2010, 8 pages.
Boureau, et al., "Ask the locals multi-way local pooling for image recognition", In IEEE International Conference on Computer Vision (ICCV), Nov. 6, 2011, 8 pages.
Li, et al., "Recognition of Deformable Object Category and Pose", In Proceedings of the IEEE International Conference on Robotics and Automation, Jun. 2014, 7 pages.
"International Search Report & Written Opinion Issued in PCT Application No. PCT/CN2014/088165", Mailed Date: Jun. 26, 2015, 13 Pages.

\* cited by examiner

GENERIC OBJECT DETECTION IN IMAGES

CROSS-REFERENCE TO RELATED APPLICATIONS

This Application claims priority to PCT Application Ser. No. PCT/CN2014/088165 filed on Oct. 9, 2014. The PCT application is hereby incorporated by reference in its entirety.

BACKGROUND

As search engine capabilities increase, so does demand for faster and more capable searches by users. Typical search engines are capable of performing text-based searches, which leaves a vast area of images outside the scope of searches unless the images include well defined and detailed textual metadata. Object detection technologies in images are typically complex undertakings involving large amounts of computing resources and lacking accuracy in many cases. For example, existing deep convolutional neural networks (CNNs) involve a fixed-size (e.g., 224×224) input image. This requirement is "artificial" and may reduce the recognition accuracy for the images or sub-images of an arbitrary size/scale.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to methods, devices, and systems to detect objects in images. An example method may include receiving an input image, generating feature maps by one or more filters on a convolutional layer of a neural network processing the input image, and spatially pooling responses of each filter at a spatial pyramid pooling (SPP) layer. Example methods may further include providing outputs of the SPP layer to a fully-connected layer as fixed dimensional vectors and training a classifier to detect one or more objects in the input image based on the fixed dimensional vectors received at the fully-connected layer.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
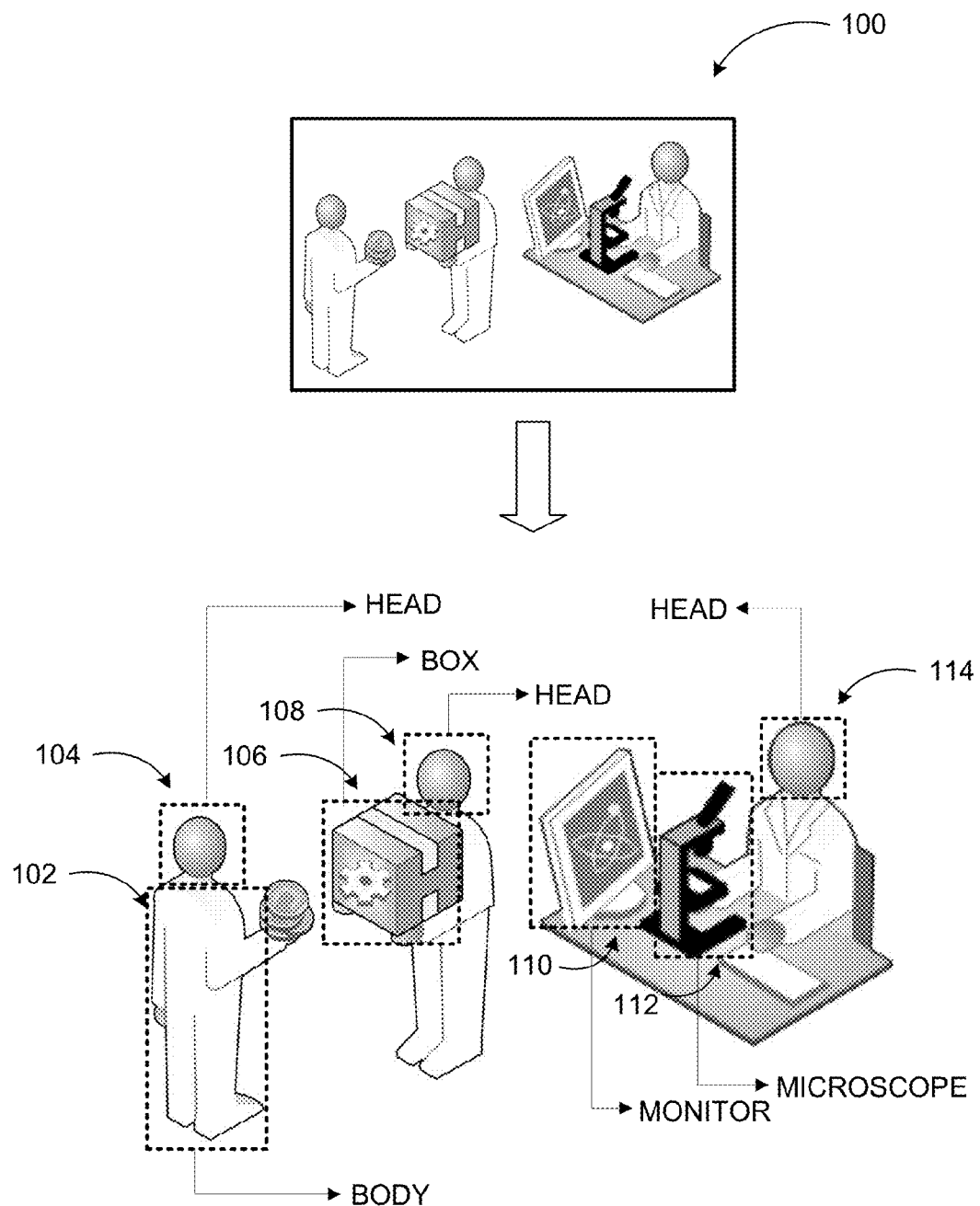
FIG. 1 includes detection of various objects in an example image.

As briefly described above, neural networks for object detection in images may be equipped with a more principled pooling strategy, spatial pyramid pooling (SPP). Using the SPP network structure, or SPP-net, a fixed-length representation may be generated regardless of image size and scale. The feature maps may be computed from the entire image once, and the features may be pooled in arbitrary regions (sub-images) to generate fixed-length representations for training the detectors. Thus, repeated computation of the convolutional features may be avoided and accuracy enhanced.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for image processing. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes detection of various objects in an example image.

The use of deep convolutional neural networks (CNNs) and the availability of large scale training data is resulting in revolutionary changes in the vision technologies, specifically, in image analysis and object detection. Deep-networks based approaches are used in image classification, object detection, and other recognition or non-recognition tasks.

Image 100 in FIG. 1, shows an example of how different types of objects such as body 102, heads 104, 108, and 114, box 106, monitor 110, and microscope 112. Each of these objects may have varying shapes, sizes, and colors. Thus, a simplistic approach may not be sufficient to detect a variety of objects in an image. While CNNs and similar approaches have improved on the state of the art of image analysis, training and testing of the CNNs still presents challenges. For example, prevalent CNNs require a fixed input image size (e.g., 224×224), which may limit both the aspect ratio and the scale of the input image. When applied to images of arbitrary sizes, such approaches may fit the input image to the fixed size, either via cropping or via warping. But, the cropped region may not contain the entire object, while the warped content may result in unwanted geometric distortion.

Recognition accuracy may be compromised due to the content loss or distortion. In addition, a pre-defined scale may not be suitable when object scales vary. Maintaining a fixed input size may overlook the challenges involving scales. A CNN mainly consists of two parts: convolutional layers, and fully-connected layers that follow. The convolutional layers operate in a sliding-window manner and output feature maps, which represent the spatial arrangement of the activations. Indeed, convolutional layers may not require a fixed image size and may generate feature maps of any sizes. On the other hand, the fully-connected layers may need to have fixed-size / length input by their definition. Hence, the fixed-size constraint may come from the fully-connected layers, which exist at a deeper stage of the network.

The example image in FIG. 1 has been described with specific objects of particular size, type, and shape. Embodiments are not limited to the detection of objects of particular sizes, shapes, or types, as well as images of particular size, type, or content. A system for object detection in an image according to embodiments may be implemented in configurations that can work with any size, type, or content of image and detect objects of any size, shape, or type using the principles described herein.

Figure 2:
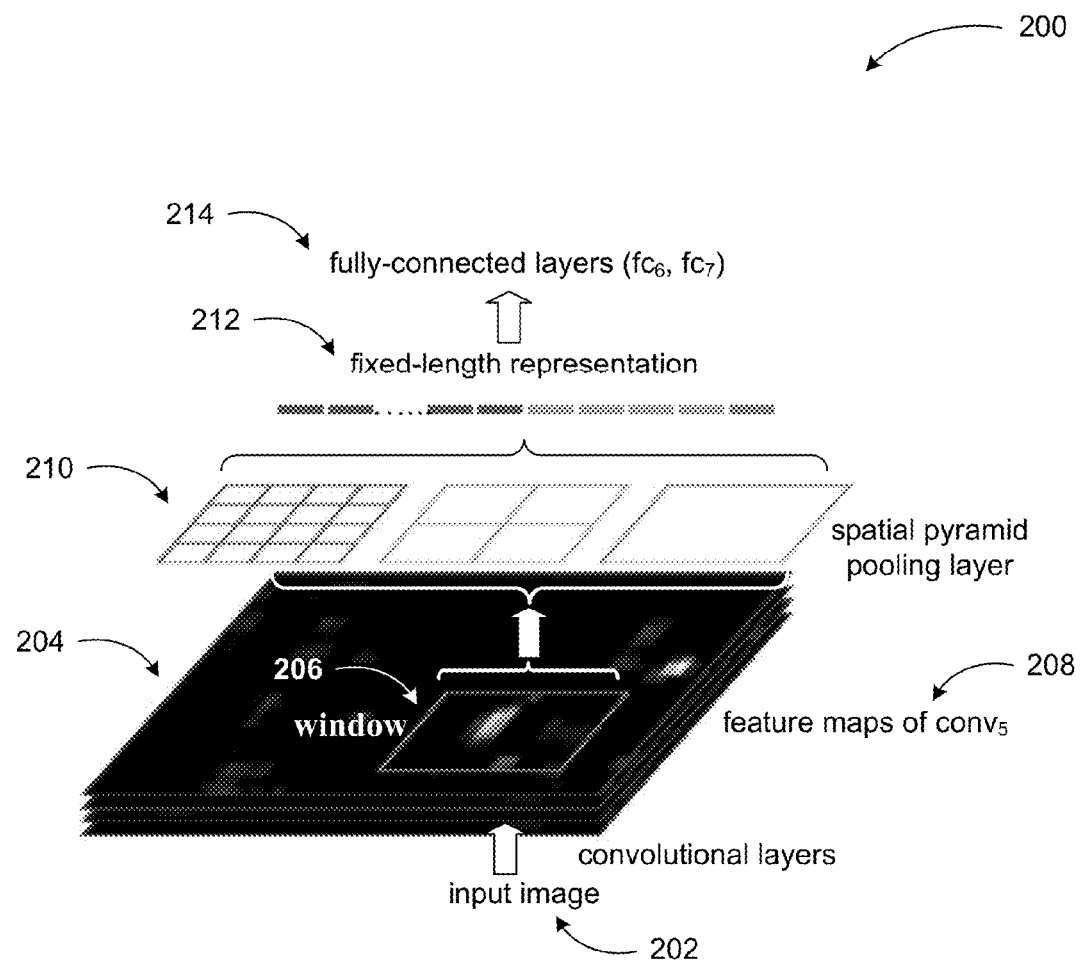
FIG. 2 illustrates pooling features from arbitrary windows on feature maps, where the feature maps may be computed from the entire image and the pooling may be performed in candidate windows.

FIG. 2 illustrates pooling features from arbitrary windows on feature maps, where the feature maps may be computed from the entire image and the pooling may be performed in candidate windows.

A system according to embodiments employs deep convolutional neural networks (CNNs) with spatial pyramid pooling (SPP) as shown in diagram 200. Considering an example seven-layer architecture, the first five layers 204 are convolutional, some of which may be followed by pooling layers 210. These pooling layers 210 may also be considered as "convolutional", in the sense that they may use sliding windows 206. The last two layers 214 may be fully connected, with an N-way classifier (e.g., softmax) as the output, where N is the number of categories. The deep network described above needs a fixed image size as discussed above due to the fully-connected layers that demand fixed-length vectors 212 as inputs. On the other hand, the convolutional layers 204 may accept inputs 202 of arbitrary sizes. The convolutional layers 204 may use sliding filters, and their outputs may have roughly the same aspect ratio as the inputs. These outputs are known as feature maps 208, which involve not only the strength of the responses, but also their spatial positions.

For example, some feature maps 208 may be generated by some filters of the conv5 layer (the fifth convolutional layer). A filter may be activated by some semantic content. For example, a filter may be activated by a circle shape; another filter may be activated by a Λ-shape; and a further filter may be activated by a v-shape. These shapes in the input images may activate the feature maps at the corresponding positions. While the convolutional layers accept arbitrary input sizes, they may produce outputs of variable sizes. The classifiers (e.g., SVM or softmax) or fully-connected layers 214 may require fixed-length vectors 212. Such vectors may be generated by SPP, which can maintain spatial information by pooling in local spatial bins. The spatial bins may have sizes proportional to the image size, so the number of bins is fixed regardless of the image size. This is in contrast to the sliding window pooling of the conventional deep networks, where the number of sliding windows depends on the input size.

Thus, in a system according to embodiments, the last pooling layer (e.g., pool5, after the last convolutional layer) may be replaced with a SPP layer 210. In each spatial bin, the responses of each filter may be pooled. The outputs of the SPP may be kM-dimensional vectors with the number of bins denoted as M (k is the number of filters in the last convolutional layer). The fixed-dimensional vectors may be used as the input to the fully-connected layer.

With spatial pyramid pooling, the input image may be of any size. Thus, not only may arbitrary aspect ratios be allowed, but arbitrary scales may also be used. The input image may be sized to any scale and the same deep network applied. When the input image is at different scales, the network (with the same filter sizes) may extract features at different scales resulting in higher accuracy.

Figure 3:
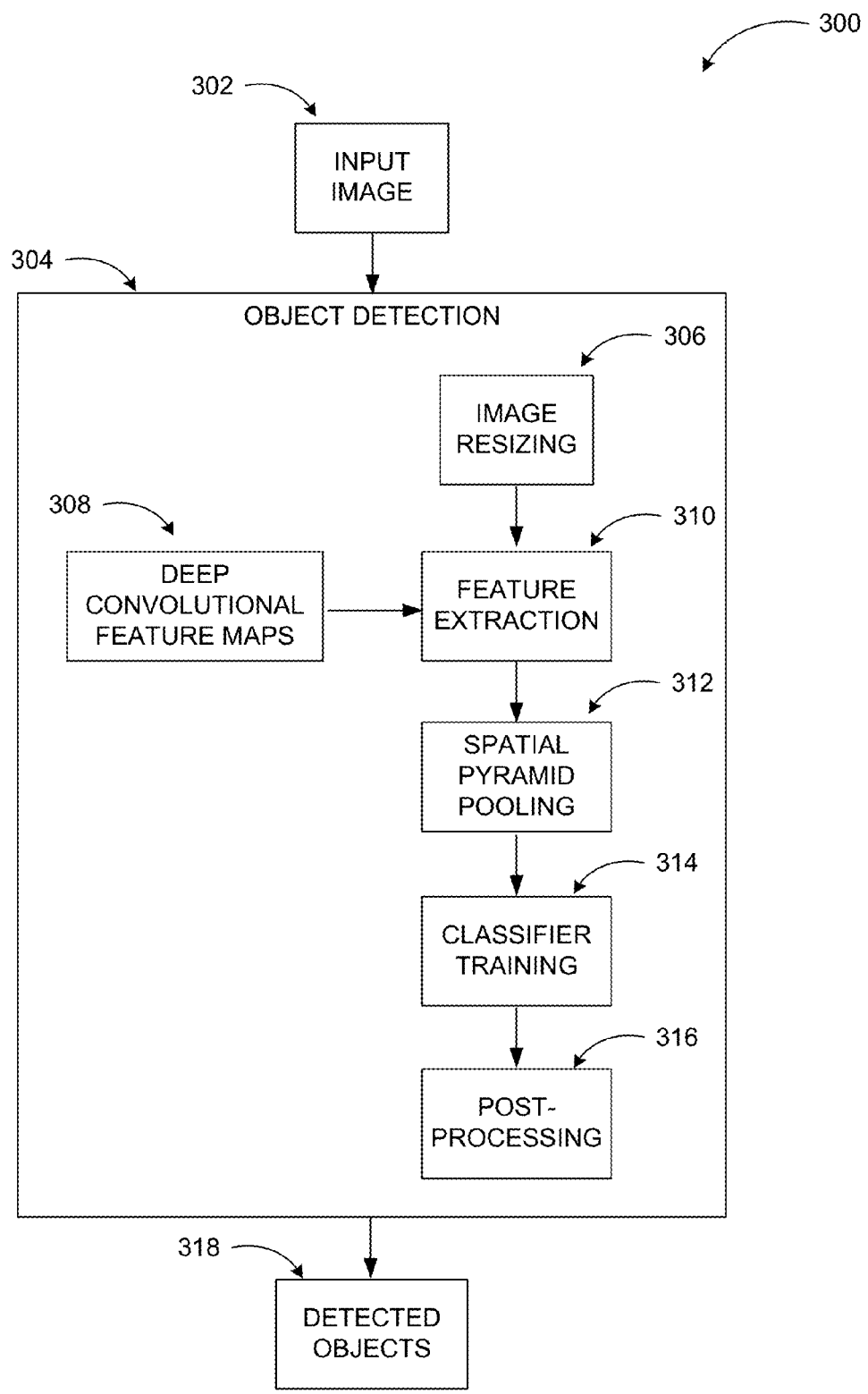
FIG. 3 illustrates an example process to perform generic object detection in an image according to some embodiments.

FIG. 3 illustrates an example process to perform generic object detection in an image according to some embodiments.

As mentioned previously, deep neural networks may be used for object detection. For example, R-CNN approach first extracts about 2,000 candidate windows from each image via selective search. Then, the image region in each window is warped to a fixed size (227×227) and a pre-trained deep neural network is used to extract the feature of each window. A binary SVM classifier is then trained on these features for detection. R-CNN may generate results of compelling quality and substantially outperforms prior approaches. However, because R-CNN repeatedly applies the deep convolutional network to about 2,000 windows per image, it may be time consuming computationally expensive. Feature extraction may be the major timing bottleneck in this approach.

As shown in diagram 300, an object detection system 302 according to embodiments employs SPP-net for object detection. The feature maps may be extracted from the entire image once (optionally at multiple scales). Then, the spatial pyramid pooling may be applied on each candidate window of the feature maps to pool a fixed-length representation of this window. Because the potentially time-consuming convolutional network is applied once, the system may detect objects on orders of magnitude faster compared to approaches such as R-CNN.

In some embodiments, window-wise features may be extracted (310) from regions of the feature maps 308 (compared to direct extraction from image regions by R-CNN). Thus, feature extraction is enabled in arbitrary windows from the deep convolutional feature maps 308. Next, a "fast" mode of selective search may be used to generate a predefined number (e.g., 2,000) of candidate windows per image. The image may be resized (306) such that min (w; h)=s, where w is the width, h is the height, and s represents a predefined scale (e.g., 256) and the feature maps of conv5 may be extracted from the entire image. In some example implementations, a 4-level spatial pyramid (1×1, 2×2, 3×3, and 6×6, total of 50 bins) may be used for each candidate window to pool the features (312). This may generate a 12,800-d (256×50) representation for each window. The representations may be provided to the fully-connected layers of the network. Then, a classifier (e.g., a binary linear SVM classifier) may be trained (314) for each category on these features.

For the classifier training the ground-truth windows may be used to generate the positive samples. The negative samples may be those overlapping a positive window by at most 30% (measured by the intersection-over-union ratio), for example. Any negative sample may be removed if it overlaps with another negative sample by more than 70% or another predefined threshold. In some examples, hard negative mining may be employed to train the classifier. In testing, the classifier may be used to score the candidate windows. Then, a non-maximum suppression with a predefined threshold (e.g., 30%) may be used on the scored windows.

In other embodiments, multi-scale feature extraction may also be used. The image may be resized such that min (w; h)=s∈{480; 576; 688; 864; 1200}, and the feature maps of conv5 may be computed for each scale. In some examples, the features from these scales may be combined by pooling them channel-by-channel. In other examples, a single scale s may be selected for each candidate window such that the scaled candidate window has a number of pixels closest to a predefined value (e.g., 224×224). Then, the feature maps extracted from this scale may be used to compute the feature of this window.

If the pre-defined scales are dense enough and the window is approximately square, the above-described approach may be roughly equivalent to resizing the window to 224×224 and then extracting features from it. Nevertheless, the feature maps are computed once (at each scale) from the entire image, regardless of the number of candidate windows.

In further embodiments, the pre-trained network may be fine-tuned. Because the features are pooled from the conv5 feature maps from windows of any sizes, the fully-connected layers may be fine-tuned in some examples. The data layer may accept the fixed-length pooled features after conv5 followed by the fc6;7 layers and a 21-way (one extra negative category) fc8 layer. The fc8 weights may be initialized with a Gaussian distribution (e.g., x=0.01). In some examples, the learning rates may be fixed to 1e-4 and then adjusted to 1e-5 for all three layers. During fine-tuning, the positive samples may be those overlapping with a ground-truth window by [0:5; 1], and the negative samples by [0:1; 0:5), for example.

In each mini-batch, 25% of the samples may be positive. In an example implementation, 250,000 mini-batches may be trained using the learning rate 1e-4, and then 50,000 mini-batches using 1e-5. Because only the fully-connected layers are fine-tuned, the training may be very fast. Furthermore, bounding box regression may be used to post-process (316) the prediction windows. The features used for regression may be the pooled features from conv5. The windows used for the regression training may be those overlapping with a ground-truth window by at least 50%, for example.

In yet other embodiments, a model combination approach may be used for object detection. Another network may be pre-trained using the same structure but different random initializations. Then, the above-described detection may be performed. Given the two models, either model may be first used to score the candidate windows on a test image. Then, non-maximum suppression may be performed on the union of the two sets of candidate windows (with their scores). A more confident window given by one model may suppress those less confident given by the other model. The complementarity may be mainly because of the convolutional layers. Combination of two randomly initialized fine-tuned results of the same convolutional model may not provide a similar gain.

The examples in FIGS. 1 through 3 have been described using specific examples, configurations, and processes to perform object detection in an image. Embodiments to perform object detection are not limited to the specific examples, configurations, and processes according to these example descriptions.

A system employing SPP-net to detect objects in images may advantageously improve usability of object detection in searches, vision systems, and other image analysis implementations, as well as reduce computational expense such as processor load, memory load, and enhance reliability of object detection, for example, in satellite imaging, security monitoring, and comparable systems.

Figure 4:
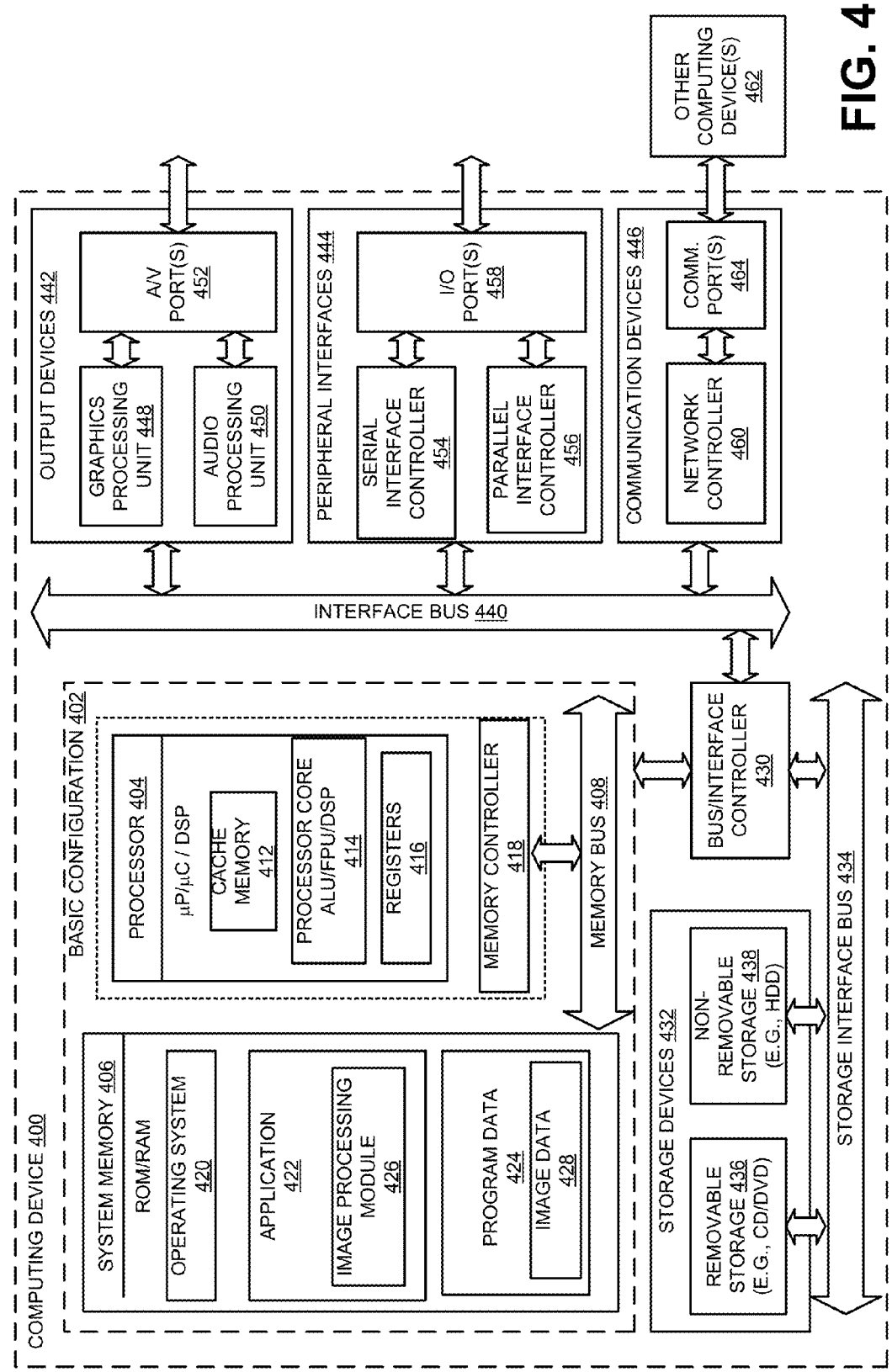
FIG. 4 is a block diagram of an example general purpose computing device, which may be used to perform generic object detection in an image.

FIG. 4 is a block diagram of an example general purpose computing device, which may be used to perform generic object detection in an image.

For example, computing device 400 may be used as a server, desktop computer, portable computer, smart phone, special purpose computer, or similar device. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (g), a microcontroller (μC), a digital signal processor (DSP), or any combination thereof The processor 404 may include one more levels of caching, such as a level cache memory 412, one or more processor cores 414, and registers 416. The example processor cores 414 may (each) include an arithmetic logic unit (ALU), a floating point unit (FPU), a digital signal processing core (DSP Core), or any combination thereof An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof The system memory 406 may include an operating system 420, an application 422, and program data 424. The application 422 may include an image processing module 426, which may be an integral part of the application or a separate application on its own. The image processing module 426 may perform image resizing, feature extraction (using deep convolutional feature maps), spatial pyramid pooling, and classifier training. Optionally, fine-tuning of the fully-connected layers and post-processing of the prediction windows may also be performed. The program data 424 may include, among other data, image data 428 related to the enablement of generic object detection in an image, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 446) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 446 includes a network controller 460, which may be arranged to facilitate communications with one or more other computing devices 462 over a network communication link via one or more communication ports 464. The one or more other computing devices 462 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods to generic object detection in an image. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 5:
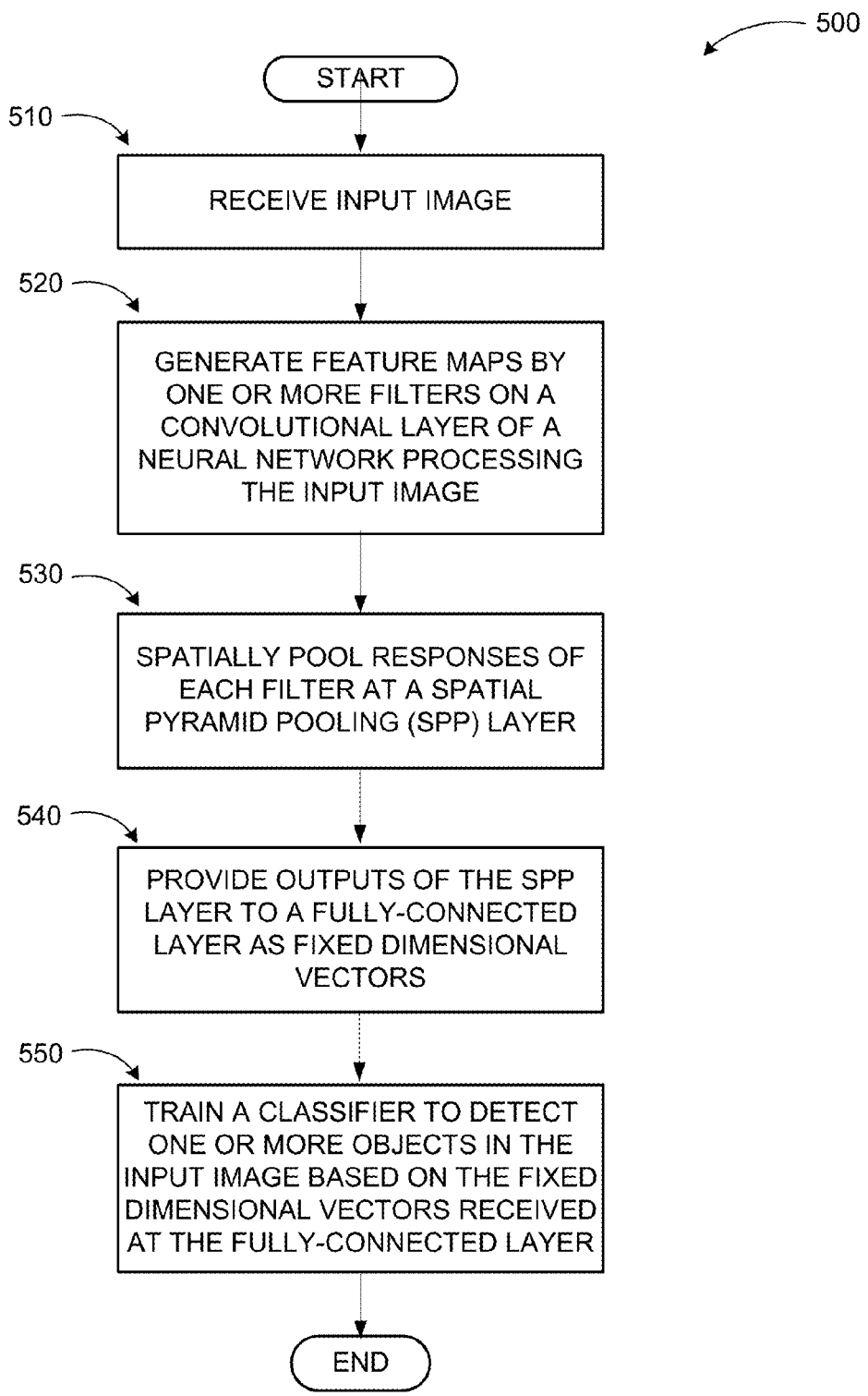
FIG. 5 illustrates a logic flow diagram of a method to perform generic object detection in an image, according to embodiments.

FIG. 5 illustrates a logic flow diagram for process 500 of a method to perform generic object detection in an image, according to embodiments. Process 500 may be implemented on a server or other system.

Process 500 begins with operation 510, where an image processing application may receive an input image to process. The image may include a number of objects of a variety of sizes, shapes, types, and colors. The image processing application may be a vision application, an analysis application, a monitoring application, a search engine, or any comparable application that is configured to detect objects in images as part of its operation.

At operation 520, feature maps may be generated by one or more filters on a convolutional layer of a neural network processing the input image. The filters may be sliding filters. The feature maps may be generated once from the entire input image at one or more scales.

At operation 530, the image processing application spatially pool responses of each filter at a spatial pyramid pooling (SPP) layer. The SPP layer may pool the responses of each filter in a plurality of spatial bins and generate a multi-dimensional output vector, where a number of dimensions of the output vector is based on a number of the plurality of spatial bins multiplied by a number of filters in a last convolutional layer.

At operation 540, outputs of the SPP layer may be provided to a fully-connected layer as fixed dimensional vectors, which may be followed by operation 550, where a classifier may be trained to detect one or more objects in the input image based on the fixed dimensional vectors received at the fully-connected layer.

The operations included in process 500 are for illustration purposes. Performance of generic object detection in an image may be implemented by similar processes with fewer or additional steps, as well as in different order of operations using the principles described herein.

According to some example embodiments, means to detect objects in images are described. Example means to detect objects in images may include means for receiving an input image, means for generating feature maps by one or more filters on a convolutional layer of a neural network processing the input image, and means for spatially pooling responses of each filter at a spatial pyramid pooling (SPP) layer. Example means to detect objects in images may further include means for providing outputs of the SPP layer to a fully-connected layer as fixed dimensional vectors and means for training a classifier to detect one or more objects in the input image based on the fixed dimensional vectors received at the fully-connected layer.

According to some example embodiments, methods to detect objects in images are described. An example method may include receiving an input image, generating feature maps by one or more filters on a convolutional layer of a neural network processing the input image, and spatially pooling responses of each filter at a spatial pyramid pooling (SPP) layer. Example methods may further include providing outputs of the SPP layer to a fully-connected layer as fixed dimensional vectors and training a classifier to detect one or more objects in the input image based on the fixed dimensional vectors received at the fully-connected layer.

According to other examples, generating the feature maps may include employing sliding filters at one or more convolutional layers configured to accept inputs of arbitrary sizes and provide outputs that approximate an aspect ratio of the inputs. Spatially pooling the responses of each filter may include pooling the responses of each filter in a plurality of spatial bins and generating a multi-dimensional output vector, where a number of dimensions of the output vector is based on a number of the plurality of spatial bins multiplied by a number of filters in a last convolutional layer.

According to further examples, the method may also include applying the SPP on each candidate window of the feature maps to pool a fixed-length representation of each candidate window and/or resizing the image following feature extraction. The outputs of the SPP layer may be representations of each window such that the classifier is trained for each category of the representations. Training the classifier may include employing ground-truth windows to generate positive samples and identifying negative samples based on an overlap with a positive window below a first predefined threshold. The method may further include removing a negative sample that overlaps with another negative sample above a second predefined threshold and/or scoring candidate windows through the classifier in a test mode. The method may also include employing non-maximum suppression with a predefined threshold on the scored candidate windows.

According to yet other examples, a computing device to perform object detection in an image is described. The computing device may include an input module configured to receive an input image through one or more of a wired or wireless communication, a memory configured to store instructions, and a processor coupled to the memory and the input module, the processor executing an image processing application. The image processing application may be configured to generate feature maps by employing one or more sliding filters on a convolutional layer of a neural network processing the input image; spatially pool responses of each filter in a plurality of spatial bins at a spatial pyramid pooling (SPP) layer; provide outputs of the SPP layer to a fully-connected layer as fixed dimensional vectors; and train a classifier to detect one or more objects in the input image based on the fixed dimensional vectors received at the fully-connected layer.

According to yet further examples, the one or more sliding filters may be activated by semantic content. The feature maps may be generated once from the entire input image at one or more scales. The image processing application may be further configured to resize the image; generate the feature maps for each scale; and combine features for each scale by pooling the features channel-by-channel. The SPP layer may include a 4-level spatial pyramid of 1×1, 2×2, 3×3, and 6×6 configuration that yields a total of 50 spatial bins. The image processing application may also be configured to fine-tune the fully-connected layer by initializing weights of the fully-connected layer, performing a first training using a first learning rate and performing a second training using a refined second learning rate. The image processing application may be further configured to post-process prediction windows using bounding-box regression, where features used for regression are pooled features from the convolution layer.

According to some examples, a computer-readable memory device with instructions stored thereon to perform object detection in an image is described. The instructions may include receiving an input image; generating feature maps by one or more filters on a convolutional layer of a first neural network processing the input image; extracting window-wise features from regions of deep convolutional feature maps; performing a selective search to generate a predefined number of candidate windows per image; spatially pooling responses of candidate windows at a spatial pyramid pooling (SPP) layer; providing outputs of the SPP layer to a fully-connected layer as fixed dimensional vectors; and training a classifier to detect one or more objects in the input image based on the fixed dimensional vectors received at the fully-connected layer.

According to other examples, the instructions may further include resizing the input image such that min (w; h)=s, where w is a width of the image, h is a height of the image, and s represents a predefined scale for the image. The instructions may also include pre-training the first neural network and a second neural network with different random initializations; scoring candidate windows on a test image through the first neural network and the second neural network; performing non-maximum suppression on a union of two sets of candidate windows with their respective scores; and selecting a window with higher score from the first neural network or the second neural network for the detection of the object.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:
1. A method to perform object detection in an image, the method comprising:
  receiving an input image;
  generating feature maps by one or more filters on a convolutional layer of a neural network processing the input image;

spatially pooling responses of each filter at a spatial pyramid pooling (SPP) layer;

providing outputs of the SPP layer to a fully-connected layer as fixed dimensional vectors; and training a classifier to detect one or more objects in the input image based on the fixed dimensional vectors received at the fully-connected layer.

2. The method of claim 1, wherein generating the feature maps comprises:

employing sliding filters at one or more convolutional layers configured to accept inputs of arbitrary sizes and provide outputs that approximate an aspect ratio of the inputs.

3. The method of claim 1, wherein spatially pooling the responses of each filter comprises:

pooling the responses of each filter in a plurality of spatial bins; and generating a multi-dimensional output vector, wherein a number of dimensions of the output vector is based on a number of the plurality of spatial bins multiplied by a number of filters in a last convolutional layer.

4. The method of claim 1, further comprising:

applying the SPP on each candidate window of the feature maps to pool a fixed-length representation of each candidate window.

5. The method of claim 1, further comprising:

resizing the image following feature extraction.

6. The method of claim 1, wherein the outputs of the SPP layer are representations of each window such that the classifier is trained for each category of the representations.

7. The method of claim 1, wherein training the classifier comprises:

employing ground-truth windows to generate positive samples; and identifying negative samples based on an overlap with a positive window below a first predefined threshold.

8. The method of claim 7, further comprising:

removing a negative sample that overlaps with another negative sample above a second predefined threshold.

9. The method of claim 1, further comprising:

in a test mode, scoring candidate windows through the classifier.

10. The method of claim 9, further comprising:

employing non-maximum suppression with a predefined threshold on the scored candidate windows.

11. A computing device to perform object detection in an image, the computing device comprising:

an input module configured to receive an input image through one or more of a wired or wireless communication;

a memory configured to store instructions; and a processor coupled to the memory and the input module, the processor executing an image processing application, wherein the image processing application is configured to:

generate feature maps by employing one or more sliding filters on a convolutional layer of a neural network processing the input image;

spatially pool responses of each filter in a plurality of spatial bins at a spatial pyramid pooling (SPP) layer;

provide outputs of the SPP layer to a fully-connected layer as fixed dimensional vectors; and train a classifier to detect one or more objects in the input image based on the fixed dimensional vectors received at the fully-connected layer.

12. The computing device of claim 11, wherein the one or more sliding filters are activated by semantic content.

13. The computing device of claim 11, wherein the feature maps are generated once from the entire input image at one or more scales.

14. The computing device of claim 11, wherein the image processing application is further configured to:

resize the image;

generate the feature maps for each scale; and combine features for each scale by pooling the features channel-by-channel.

15. The computing device of claim 11, wherein the SPP layer comprises a 4-level spatial pyramid of 1×1, 2×2, 3×3, and 6×6 configuration that yields a total of 50 spatial bins.

16. The computing device of claim 11, wherein the image processing application is further configured to:

fine-tune the fully-connected layer by initializing weights of the fully-connected layer, performing a first training using a first learning rate and performing a second training using a refined second learning rate.

17. The computing device of claim 11, wherein the image processing application is further configured to:

post-process prediction windows using bounding-box regression, wherein features used for regression are pooled features from the convolution layer.

18. A computer-readable memory device with instructions stored thereon to perform object detection in an image, the instructions comprising:

receiving an input image;

generating feature maps by one or more filters on a convolutional layer of a first neural network processing the input image;

extracting window-wise features from regions of deep convolutional feature maps;

performing a selective search to generate a predefined number of candidate windows per image;

spatially pooling responses of candidate windows at a spatial pyramid pooling (SPP) layer;

providing outputs of the SPP layer to a fully-connected layer as fixed dimensional vectors; and training a classifier to detect one or more objects in the input image based on the fixed dimensional vectors received at the fully-connected layer.

19. The computer-readable memory device of claim 18, wherein the instructions further comprise:

resizing the input image such that min (w; h)=s, where w is a width of the image, h is a height of the image, and s represents a predefined scale for the image.

20. The computer-readable memory device of claim 19, wherein the instructions further comprise:

pre-training the first neural network and a second neural network with different random initializations;

scoring candidate windows on a test image through the first neural network and the second neural network; and performing non-maximum suppression on a union of two sets of candidate windows with their respective scores; and selecting a window with higher score from the first neural network or the second neural network for the detection of the object.

* * * * *